United States Patent Office 3,702,348
Patented Nov. 7, 1972

3,702,348
PROCESS FOR THE PREPARATION OF SATURATED MONOCYCLIC MONOTERPENES
Rudolf Nehring and Gunter Hockele, Marl, and Gerhard Ludwig, Lippramsdorf, Germany, assignors to Chemische Werke Huls Aktiengesellschaft, Marl, Germany
No Drawing. Filed Oct. 19, 1970, Ser. No. 82,209
Claims priority, application Germany, Oct. 20, 1969,
P 19 52 725.4
Int. Cl. C07c 13/16
U.S. Cl. 260—675.5        12 Claims

ABSTRACT OF THE DISCLOSURE

An improved process for the hydrogenation of eucalyptol and/or 1,4-cineol and mixtures of unsaturated monocyclic monoterpenes comprising reducing them, preferably continuously with a hydrogenation catalyst which prior to reduction consists essentially of nickel, 10–60% by weight;
calcined aluminum oxide, 10–87.3% by weight;
zinc oxide, 0–40% by weight; and
silicon dioxide, 0–5% by weight.

BACKGROUND OF THE INVENTION

This invention relates to a process for the preparation of saturated monocyclic monoterpenes.

It is known that a mixture of monocyclic terpene hydrocarbons is produced by the pyrolysis of eucalyptol (1,8-cineol) at 240–350° C. in the presence of Raney nickel (Takeshi Waki, Nippon Kagaku Zasshi 81, 131 (1960); cf. Chemical Abstracts 56, 508d (1962)). As the main product of the pyrolysis, dipentene is formed by dehydration. In addition, $\alpha$-terpinene and terpinolene are produced, as well as p-cymene and p-menthane, the latter probably by disproportionation of the unsaturated non-aromatic terpenes. This pyrolysis reaction involves high catalyst consumption and does not result in complete conversion. Moreover, the process has the disadvantage that the thus-formed mixture must be hydrogenated in a second step in order to produce saturated terpene hydrocarbons. Hydrogenation of eucalyptol and 1,4-cineol and mixtures comprising them to p-menthane employing conventional nickel-based catalysts has the disadvantage of short catalyst life and impure products.

OBJECTS OF THE INVENTION

It is an object of this invention to provide a process for the production in a simple manner of saturated monocyclic monoterpenes from 1,8-cineol (eucalyptol) and/or 1,4-cineol. Other objects will be apparent to those skilled in the art to which this invention pertains.

SUMMARY OF THE INVENTION

According to this invention, saturated monocyclic terpenes are produced by hydrogenating 1,8-cineol (eucalyptol) and/or 1,4-cineol or mixtures comprising them under elevated pressure and at an elevated temperature in the presence of a catalyst containing, prior to reduction, nickel, 10–60% by weight;
calcined aluminum oxide, 10–87.3% by weight;
zinc oxide, 0–40% by weight; and
silicon dioxide, 0–5% by weight.

DETAILED DISCUSSION

Any mixture comprising 1,8-cineol (eucalyptol) and/or 1,4-cineol reducible to a saturated terpene hydrocarbon can be hydrogenated according to the process of this invention. Both said pure terpene ethers and terpene mixtures comprising them can be employed.

The process is especially suitable for the preparation of p-menthane from eucalyptol (1,8-cineol) and/or from 1,4-cineol or mixtures comprising them. A quantitative conversion of eucalyptol or 1,4-cineol into p-menthane can be obtained according to the process of this invention.

In the production of p-menthane according to the process of this invention, pure eucalyptol, which is obtainable only with difficulty, preferably is not employed. Instead, a terpene mixture containing, in addition to eucalyptol, other unsaturated monocyclic monoterpenes, especially menthadienes, is preferably employed. Such a terpene mixture can contain, for example, d- and l-limonene, dipentene, $\alpha$-terpinene, terpinolene, and other menthadienes in varying proportions, in addition to eucalyptol. In the process of this invention, the menthadienes are also hydrogenated quantitatively.

In a preferred embodiment, the catalyst employed in the process of this invention contains, in its unreduced state, nickel, 20–40% by weight;
calcined aluminum oxide, 15–40% by weight;
zinc oxide, 15–40% by weight; and
silicon dioxide, 1–5% by weight.

Especially suitable are catalysts containing, in their unreduced condition, nickel, 25–35% by weight;
calcined aluminum oxide, 15–30% by weight;
zinc oxide, 25–35% by weight; and
silicon dioxide, 2–4% by weight.

These catalysts can be produced in accordance with the process of German Pats. 1,215,659 or 1,263,711. In such a process, the calcined aluminum oxide is present in as finely divided a form as possible (particle size maximally $20\mu$, preferably below $10\mu$). In order to obtain the benefits of the zinc oxide, which optionally but preferably is present in the catalyst, it also should be in finely divided form (particle size maximally $10\mu$), preferably as a highly dispersed product (particle size maximally $1\mu$). Similar considerations apply with respect to the silicon dioxide, which should be employed in particle sizes not exceeding 50 m$\mu$. Such silicon dioxides can be produced, for example, by flame hydrolysis of silicon tetrachloride. The above-mentioned particle sizes refer to primary particles.

To produce the catalysts according to the above-mentioned process, aluminum oxide and silicon dioxide, and optionally zinc oxide, are suspended in an aqueous solution of nickel nitrate. The nickel is precipitated by the addition of an aqueous solution of sodium bicarbonate. The precipitate is isolated, thoroughly washed, dried, and pressed into tablets which are calcined, e.g., at 350° C. Prior to use, they are reduced with hydrogen, e.g., at 350–450° C.

The catalysts employed according to the process of this invention exhibit a markedly higher lifetime than, for example, commercial impregnated nickel catalysts.

The following table shows the differences between a catalyst according to the process of this invention (A) and a commercial catalyst according to the comparative example (B):

| | A | B |
|---|---|---|
| Bulk density, g./ml. | ~1.1 | ~0.6 |
| Water absorption [ml./g.] | ~0.4 | ~0.7 |
| Specific surface [m.²/g.] (BET) | ~120 | ~220 |
| | Shaped tablets | Lumpy silica gel. |
| | Resistance against sulphur and halogens. | |

Although menthadiene-eucalyptol mixtures can be converted into p-menthane using a commercial impregnated nickel catalyst on a silica gel base, the eucalyptol is converted into p-menthane only to a limited extent. Also, the useful life of the catalyst is quite limited. When this commercial catalyst is employed, an increase in the hydrogenating temperature results in an improved p-menthane yield by a higher eucalyptol conversion. However, the lifetime of the silica gel catalyst is markedly reduced under these more stringent hydrogenating conditions. In contrast thereto, the catalysts employed in the process of this invention permit the complete conversion of the eucalyptol with a substantially longer catalyst lifetime.

In the hydrogenation process of this invention, it is also possible to use, in addition to the catalyst as described herein, a larger or smaller amount of conventional impregnated nickel catalysts on a silica gel base. For example, only 20% by weight of the hereindescribed catalyst in the total hydrogenation catalyst employed is sufficient to obtain a quantitative eucalyptol conversion and a considerably improved catalyst lifetime.

The nickel content of the total catalyst does not have a substantial effect on the lifetime of the catalyst and the eucalyptol conversion. With higher amounts of the catalyst employed in the process of this invention in the total catalyst, the lifetime of the total catalyst is further increased, and the charge capacity thereof is also raised. Preferably, the hydrogenation catalyst consists of at least 25% by weight, especially at least 30% by weight, of the hereindescribed catalyst.

The claimed process is preferably conducted continuously but can be conducted batch-wise as well. In a continuous process, the catalyst is normally employed as a solid bed with press-shaped catalyst bodies being arranged in an upright reactor. In this type of catalyst arrangement, it was found especially advantageous when concomitantly using conventional impregnated nickel catalysts along with the catalysts employed in the process of this invention, to arrange the latter catalyst as the uppermost layer of the solid catalyst bed.

After the reduction of the catalyst, the product or product mixture to be converted is sprinkled over the catalyst, or passed in the vaporized form over the catalyst, while hydrogen is simultaneously conducted through the reactor.

The reaction can be conducted at any desired pressure, but preferably pressures of 50 to 350 atmospheres gauge, especially pressures of 250 to 350 atmospheres gauge, are employed.

Depending on the content of unsaturated monocyclic monoterpenes in the starting mixture and depending on the reactor load, peak temperatures of up to above 300° V. can occur when employing reactor inlet temperatures of 100–270° C. However, these peak temperatures can be lowered by rapid circulation of the hydrogen and efficient heat removal. Preferably, the process is conducted at reactor inlet temperatures of between 110 and 180° C., with care being taken so that the peak temperatures are between 180 and 300° C., preferably between 200 and 275° C., i.e., the process is preferably conducted at mean reactor temperatures of between 145 and 220° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Preparation of NiO, $Al_2O_3$, ZnO catalyst

In a precipitator, 650 kg. of nickel nitrate $$(Ni(NO_3)_2 \cdot 6H_2O)$$

is dissolved in 1,700 l. of distilled water. In this solution are suspended 125 kg. of calcined zinc oxide (particle size: about $1\mu$), 85 kg. of calcined aluminum oxide (particle size: about $5\mu$), and 7.5 kg. of silica ("Aerosil"; particle size: 20–40 m$\mu$). Precipitation of the nickel is effected at room temperature by the addition of a soda-free solution of 410 kg. of sodium bicarbonate in 5,000 l. of distilled water. The suspension is heated to 50° C. and vacuum-filtered. The precipitate is washed free of nitrate, dried at 110° C., comminuted, mixed with a molding agent which provides about 3 to 4% by weight of graphite and about 10% by weight of water, based on the mixture of catalyst and shaping agent, condensed, granulated, and pressed into tablets. These tablets are calcined under a nitrogen stream at 350° C. The catalyst contains 39% by weight of NiO, which corresponds to 30.7% by weight of Ni, 20% by weight of $Al_2O_3$, 32% by weight of ZnO and 3% by weight of $SiO_2$. The calcining loss is 6% by weight.

EXAMPLE 1

A solid-bed reactor is filled with the above-described catalyst. After reducing the catalyst, a complete conversion of eucalyptol into p-menthane takes place at an average hydrogenation temperature of 275° C. (reactor inlet temperature: 260° C., peak temperature: 290° C.), a total pressure of 300 atmospheres gauge, and a throughput of 0.1 kg. per hour of eucalyptol of at least 99% purity per kg. of catalyst. The secondary components, detectable by gas chromatography, in the thus-obtained p-menthane are under 1% by weight.

In Examples 2–4 and Comparative Examples A and B, set forth below, a terpene mixture was employed containing 21% by weight of eucalyptol and 79% by weight of unsaturated monocyclic monoterpenes (by gas chromatography, 10–6 menthadienes and menthenes could be detected).

The results of Examples 2–4 and Comparative Examples A and B are compiled in the table below.

Preparation of Conventional NiO, CuO, $Cr_2O_3$ catalyst

Large-porous, lumpy silica gel is impregnated under a vacuum with an aqueous, chromic-acid-containing, hot nickel-copper nitrate solution containing 13.3% by weight of nickel, 4.4% by weight of copper, and 0.7% by weight of chrominum. After removing the excesss solution, the catalyst is dried at 120–130° C. and calcined at 350–400° C. in an air stream. The catalyst contains 19% by weight of NiO (corresponding to 15% by weight of Ni). 6.25% by weight of CuO (corresponding to 5% by weight of Cu) and 1.5% by weight of $Cr_2O_3$ (corresponding to 1.0% by weight of Cr), with 2.25% by weight calcining loss.

COMPARATIVE EXAMPLE A

The above-described impregnated nickel catalyst is arranged in the form of a solid bed in a hydrogenation reactor and reduced in a hydrogen atmosphere at 300° C. At an hourly throughput of 0.65 kg. of terpene mixture per kg. of catalyst, the product is hydrogenated under a total pressure of 300 atmospheres gauge at a reaction inlet temperature of 150° C. Under these conditions, with a hydrogen circulation rate of 10 Nm.³/kg. of starting material, a peak temperature of 205° C. is obtained in the furnace. In the hydrogenated product, 9% by weight of eucalyptol can be detected. After a total load of 140 kg. of terpene mixture per kg. of catalyst, the catalyst has become unusable for any further use.

COMPARATIVE EXAMPLE B

The same impregnated nickel catalyst as employed in Example A is charged, in a solid-bed reactor, with 0.48 kg. per hour of the terpene mixture per kg. of catalyst mass. In the hydrogenated product, 4% by weight is still detected, although better results were to be expected with the lower throughput rate and the higher reaction temperature (170° C. reactor inlet temperature, 240° C. peak temperature). After a total load of only 115 kg. of terpene mixture per kg. of catalyst, the catalyst is completely inactivated.

EXAMPLE 2

The solid-bed reactor is filled to capacity with a mixed catalyst consisting of 80% by weight of the nickel impregnated silica gel catalyst employed in Comparative Examples A and B, covered with a layer of 20% by weight of the nickel catalyst employed in Example 1. At an hourly conversion rate of 0.60 kg. of terpene mixture per kg. of catalyst, a peak temperature of 230° C. is obtained at a reactor inlet temperature of 150° C., under the additional reaction conditions described in Comparative Example 1. In one catalyst contact step, 190 kg. per kg. of catalyst of terpene mixture can be converted into p-menthane, without any detectable eucalyptol being present in the hydrogenated product.

EXAMPLE 3

In this example, the proportion of the catalyst employed in Example 1 in the catalyst bed is increased to 32% by weight, and also the latter catalyst once again is the upper layer of the catalyst bed and is first contacted by the starting terpene mixture. At an hourly throughput of 0.63 kg. of terpene mixture per kg. of catalyst, under the conditions of Example 2, no reduction in catalyst activity is detected after a total load of 300 kg. of terpene mixture per kg. of catalyst. Eucalyptol cannot be detected in the hydrogenated product.

EXAMPLE 4

A further increase to 60% by weight in the proportion of the catalyst employed in Example 1 in the catalyst bed, makes it possible to obtain, under the conditions of Example 2, a throughput of 0.70 kg. per hour of terpene mixture per kg. of catalyst. After a total load of 350 kg. of terpene mixture per kg. of catalyst, the experiment is terminated without any detectable reduction in the activity of the catalyst or the presence of eucalyptol in the hydrogenated product. The catalyst can subsequently be employed, with very great success, in further hydrogenation processes, even for hydrogenations of aromatics.

can easily ascertain the essential characteristics of this invention, and without departing from the spirit and scope thereof, can make various changes and modifications of the invention to adapt it to various usages and conditions.

What is claimed is:

1. A process for the preparation of saturated monocyclic monoterpenes by the hydrogenation of a monocyclic monoterpene comprising 1,8-cineol, 1,4-cineol or both at elevated pressure and temperature in the presence of a hydrogenation catalyst, which comprises conducting the hydrogenation in the presence of a hydrogenation catalyst comprising a reduced mixed metal catalyst containing, in unreduced calcined condition,
    nickel, 10–60% by weight;
    calcined aluminum oxide, 10–87.3% by weight;
    zinc oxide, 0–40% by weight; and
    silicon dioxide, 0–5% by weight.

2. A process according to claim 1 wherein the reduced mixed metal catalyst, in unreduced calcined condition, contains
    nickel, 20–40% by weight;
    calcined aluminum oxide, 15–40% by weight;
    zinc oxide, 15–40% by weight; and
    silicon dioxide, 1–5% by weight.

3. A process according to claim 2 wherein the reduced mixed metal catalyst, in unreduced calcined condition, contains
    nickel, 25–35% by weight;
    calcined aluminum oxide, 15–30% by weight;
    zinc oxide, 25–35% by weight; and
    silicon dioxide, 2–4% by weight.

4. A process according to claim 1 for the preparation of p-menthane wherein the starting material is 1,8-cineol.

5. A process according to claim 4 wherein a terpene mixture comprising 1,8-cineol is employed as the starting material.

6. A process according to claim 1, wherein at least 20% of the hydrogenation catalyst is the reduced mixed, metal catalyst.

7. A process according to claim 6 wherein the reduced catalyst is employed as the upper layer of a solid catalyst bed.

8. A process according to claim 1, characterized in that the hydrogenation is conducted at a pressure of 50–350 atmospheres gauge.

9. A process according to claim 1 wherein the hydrogenation is conducted at a temperature of between 100 and 300° C.

10. A continuous hydrogenation process according to claim 1 wherein a terpene mixture reducible to p-menthane and comprising eucalyptol is hydrogenated at a pressure of 50–350 atmospheres gauge and at a temperature of between 100 and 300° C. by contacting the starting terpene mixture with a solid catalyst bed through

| Experiment | Weight proportion | | Throughput (kg./hr. terpene mixture per kg. catalyst) | Average hydrogenation temperature, ° C. | Total load (kg. terpene mixture per kg. catalyst) | Eucalyptol in hydrogenated product, percent by wt. |
|---|---|---|---|---|---|---|
| | 15% Ni, 5% Cu, 1% Cr on SiO$_2$ a | 30.7% Ni, 20% Al$_2$O$_3$, 32% ZnO, and 3% SiO$_2$ a | | | | |
| Comparison Example: | | | | | | |
| A | 100 | | 0.65 | 197 | 140 | 9 |
| B | 100 | | 0.48 | 204 | 115 | 4 |
| Example: | | | | | | |
| 2 | 80 | 20 | 0.60 | 204 | 190 | |
| 3 | 68 | 32 | 0.63 | 204 | >300 | |
| 4 | 40 | 60 | 0.70 | 204 | >350 | | a Catalyst in catalyst packing.

The preceding examples can be repeated with similar success by substituting the generically or specifically described reactants and/or operating conditions of this invention for those used in the preceding examples.

From the foregoing description, one skilled in the art which a stream of hydrogen is passed, at least the upper 20% of which is the reduced mixed metal catalyst.

11. A process according to claim 10 wherein the reduced mixed metal catalyst, in unreduced calcined condition, contains nickel, 20–40% by weight;
calcined aluminum oxide, 15–40% by weight;
zinc oxide, 15–40% by weight; and
silicon dioxide, 1–5% by weight.

12. A process according to claim 11 wherein the reduced mixed metal catalyst, in unreduced calcined condition, contains
nickel, 25–35% by weight;
calcined aluminum oxide, 15–30% by weight;
zinc oxide, 25–35% by weight; and
silicon dioxide, 2–4% by weight.

References Cited
UNITED STATES PATENTS

| | | | |
|---|---|---|---|
| 2,785,208 | 3/1957 | Bain et al. | 260—675.5 |
| 3,440,272 | 4/1969 | Frainnet et al. | 260—675.5 |

CURTIS R. DAVIS, Primary Examiner

U.S. Cl. X.R.

260—611 A, 631 H, 631.5